United States Patent [19]

Kaltschmidt

[11] Patent Number: 4,950,881

[45] Date of Patent: Aug. 21, 1990

[54] METHOD AND APPARATUS FOR TRACKING A MISSILE

[75] Inventor: Horst Kaltschmidt, Neubiberg, Fed. Rep. of Germany

[73] Assignee: Messerschmitt-Boelkow-Blohm GmbH, Munich, Fed. Rep. of Germany

[21] Appl. No.: 281,839

[22] Filed: Dec. 8, 1988

[30] Foreign Application Priority Data

Dec. 10, 1987 [DE] Fed. Rep. of Germany ....... 3741856

[51] Int. Cl.$^5$ ............................................... G01S 3/78
[52] U.S. Cl. ................................................ 250/203.6
[58] Field of Search .................... 250/203 R, 203 CT; 356/141, 152

[56] References Cited

U.S. PATENT DOCUMENTS 3,967,899 7/1976 O'Meara .
4,849,620 7/1989 Guerin et al. .

Primary Examiner—Charles T. Jordan
Assistant Examiner—Richard W. Wendtland
Attorney, Agent, or Firm—W. G. Fasse; D. H. Kane, Jr.

[57] ABSTRACT

An opto-electronic, interference protected missile tracking system operates according to the multiple shutter shifting method, thereby employing a matrix which may have a plurality of liquid crystal cells or deformable mirror devices. These cells or devices are arranged in a rectangular coordinate system and thus have an inherent location determination so that the need for a mechanically movable reticle is obviated. The individual image points in the matrix are modulated under the control of a location determining central processing unit whereby the individual control covers an "n×m" vicinity around the image point or pixel that is illuminated by the useful incoming light.

14 Claims, 4 Drawing Sheets

FIG.5

| PIXEL | FREQUENCY CONTENT |
|---|---|
| $x_1, y_1$ | $fx_1 - fy_1, fx_1 + fy_1$ |
| $x_1, y_2$ | $fx_1 - fy_2, fx_1 + fy_2$ |
| $x_1, y_3$ | $fx_1 - fy_3, fx_1 + fy_3$ |
| $x_2, y_1$ | $fx_2 - fy_1, fx_2 + fy_1$ |
| $x_2, y_2$ | $fx_2 - fy_2, fx_2 + fy_2$ |
| $x_2, y_3$ | $fx_2 - fy_3, fx_2 + fy_3$ |
| $x_3, y_1$ | $fx_3 - fy_1, fx_3 + fy_1$ |
| $x_3, y_2$ | $fx_3 - fy_2, fx_3 + fy_2$ |
| $x_3, y_3$ | $fx_3 - fy_3, fx_3 + fy_3$ |

TABLE I: PIXEL AND FREQUENCY CONTENT

FIG.6

| PIXEL | DIFFERENCE FREQUENCY/kHz |
|---|---|
| $x_1 y_1$ | 0,2 |
| $x_1 y_2$ | 0,5 |
| $x_1 y_3$ | 0,8 |
| $x_2 y_1$ | 1,2 |
| $x_2 y_2$ | 1,5 |
| $x_2 y_3$ | 1,8 |
| $x_3 y_1$ | 2,2 |
| $x_3 y_2$ | 2,5 |
| $x_3 y_3$ | 2,8 |

TABLE II: EXAMPLE OF PIXEL FREQUENCY PLAN

METHOD AND APPARATUS FOR TRACKING A MISSILE

FIELD OF THE INVENTION

The invention relates to a method and apparatus for tracking a missile. More specifically, the present method and apparatus involve an electronic and optical tracking of a missile in an interference protected manner. The method and apparatus use a multi-shutter shifting method in which shutters are switched opto-electronically or mechanically to become transparent. These shutters are moved to follow-up on an image point formed by received light and, if applicable, to follow-up on interference image points. The image points formed by received light may be realized for example, in a liquid crystal matrix or in a deformable mirror device matrix.

BACKGROUND INFORMATION

A known effective means against interference light or interfering light points is the use of a mechanical shutter for shutting out such interfering light or interfering light points from the reticle. Thus, it is possible to make sure that only the intensity of the remaining image point of the received light is effective on the detector. However, it is a disadvantage of all methods employing a shutter that interfering processes are not recognized and hence that they cannot be pursued. As soon as a brighter process or interference occurs than the signal process (i.e. the IR-signature of the missile) in the shutter window, the interference overshadows the signal process. This disadvantage lead to the conception of the so-called fixed shutter method, wherein shortly after the start of the missile a mechanical initially large aperture shutter is placed in front of the reticle. Thereafter, as a function of time ever smaller shutters are inserted.

Said fixed shutter method has the disadvantage that the system must work, on the one hand, with relatively large shutter windows so that interference sources in the vicinity of the missile cannot effectively be shuttered out. On the other hand, movements of the missile resulting in larger deviations from the line of sight may cause the loss of the missile by the tracking system.

Such a disadvantage, or rather loss, is avoided by the shutter shifting method (travelling shutter). In that method a mechanical or opto-electronic shutter which is switchable to become transparent, is caused to follow the image point of the received light on the reticle, whereby the size and location of the shutter is variable. The advantage of the shutter shifting method, as compared to the fixed shutter method, is seen in that the course of the motion and intensity of the useful or desired process is followed, whereby it can be continuously compared, for example with a model course. As a result it is possible to recognize a briefly occurring interfering process and to overcome the interfering process by means of a prediction process. However, even the shutter shifting method has the disadvantage that outside of the shutter window no information regarding any interfering process can be obtained and evaluated.

The opto-electronic shutter shifting method in which the shutter is switched to become transparent and which uses a liquid crystal matrix avoids the movable parts that are required in the mechanical shutter shifting method. However, the opto-electronic shutter shifting method has the disadvantage that the transparency cannot be switched between totally open and totally closed so to speak. Rather, an opto-electronically switched shutter is in fact only about 70% "open" in its transparent condition and in its "closed" condition the shutter is only less transparent by a factor of roughly 300 as compared to the open transparency. A mechanical shutter is either fully open or fully closed.

OBJECTS OF THE INVENTION

In view of the foregoing it is the aim of the invention to achieve the following objects singly or in combination:

to provide an opto-electronic tracking system for (OCM: optical counter measure) a missile which system is protected against interference, and which avoids the above mentioned disadvantages of the prior art;

to provide such a system which can obviate a mechanically travelling reticle or a mechanically shifted shutter system; and to use but one photo-diode for imaging a scene, thereby avoiding expensive mechanical scanners.

SUMMARY OF THE INVENTION

The system according to the invention for an opto-electronically, interference protected missile tracking is characterized in that the individual image points of a liquid crystal matrix (LC-matrix) or of a deformable mirror device (DMD-matrix) are controlled by a locating computer for individually modulating the image points in the vicinity around an input light point. This vicinity is determined by $n \times m$, wherein n and m are matrix fields in the y- and x-direction respectively, of a rectangular coordinate system in which the matrix is located. If the matrix is a liquid crystal matrix, each field is a liquid crystal cell. In that case, each liquid crystal cell has its own transparent front and back electrode. An alternating voltage having a determined frequency, is applied to a pixel determined by the respective x- and y-coordinates. The alternating light from the pixel is recorded by a photocell, the output of which passes through a band filter for providing a useful pixel signal. A focussing lens is positioned between the matrix and the photocell or light sensitive diode. The present invention is based on a so-called "pixel individually modulated" matrix which, as stated may be an LC-matrix or a DMD-matrix, referred to herein as PIM-method. In the present PIM-method the individual image points of the matrix are controlled by the locating and tracking computer forming part of the central processing unit. The control extends to the $n \times m$ vicinity around the input light point for individually modulating the respective image points. This $n \times m$ vicinity is referred to as an information window.

BRIEF DESCRIPTION OF THE DRAWINGS

In order that the invention may be clearly understood, it will now be described, by way of example, with reference to the accompanying drawings, wherein:

FIG. 5 is a Table I with the pixels defined by their rectangular coordinates and their frequency content; and FIG. 6 is a Table II illustrating an example of a pixel frequency plan.

DETAILED DESCRIPTION OF PREFERRED EXAMPLE EMBODIMENTS AND OF THE BEST MODE OF THE INVENTION

Figure 1:
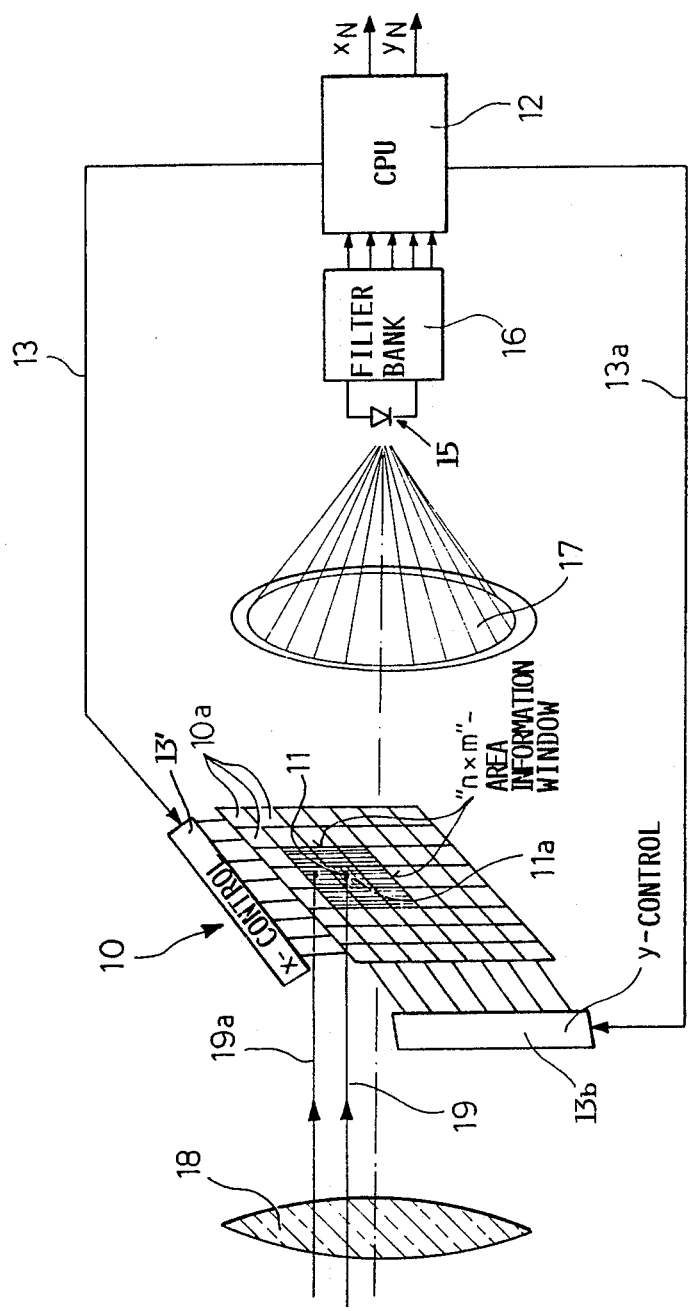
FIG. 1 illustrates schematically the system according to the invention for performing the present method in one embodiment.

FIG. 1 shows the basic system arrangement for performing the method according to the invention, wherein an input optical means such as a lens 18 is arranged for viewing the scene. The missile with its light emitting device to be tracked and any interfering light sources or radiation sources are part of the scene. The light from the missile to be tracked provides the signal beam 19 while the interfering radiation provides an interfering beam 19a. The lens 18 projects these beams 19 and 19a onto the matrix 10 comprising a plurality of matrix cells 10a in the form of liquid crystal cells or deformable mirror device cells. These cells are arranged in a rectangular coordinate system having an x-axis and a y-axis.

Figure 2:
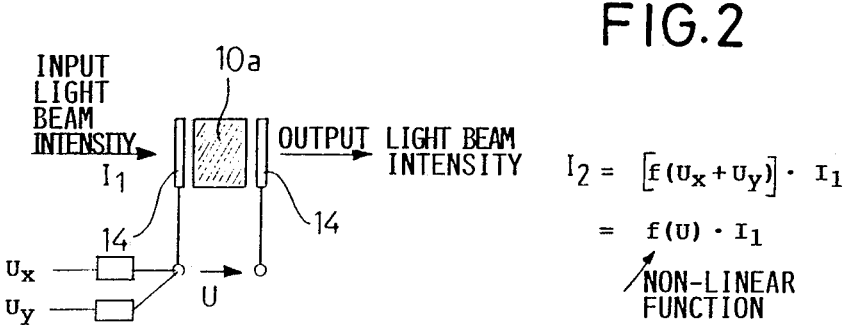
FIG. 2 illustrates schematically one pixel or matrix field whereby the pixel may be realized by a liquid crystal cell or by a deformable mirror device, or by a matrix of small mirrors, which can be individually tilted (switched) by the CPU.

If the matrix is a liquid crystal matrix, the individual cells are constructed as shown in FIG. 2 having a liquid crystal 10a between two transparent electrodes 14. A voltage U is applied to the respective electrodes for controlling the light transparency of the individual cell. The control is within the range of 10 to 90%. In other words, when the cell is substantially dark, its transparency is about 10% and when the cell is substantially transparent, its transparency is about 90%.

Referring further to FIG. 1, the light-dark control of the matrix 10 is accomplished by a central processing unit 12 including a respective computer. The CPU 12 is connected through an x-wire 13 to the x-control 13' which in turn is connected to the respective electrodes of the matrix. The computer is further connected through a y-wire 13a to the y-control 13b which in turn is connected to the respective electrodes of the matrix. Thus, any field pixel 11 determined by the x,y-coordinates can be switched to become transparent while all other cells 10a of the matrix remain opaque or substantially opaque. The cells 10a may also be formed by small mirrors, so-called micro-mechanical mirrors, which can be tilted back and forth between a reflecting position and a non-reflecting position. An alternating voltage having a determined frequency is applied to the selected pixel 11 defined by its x- and y-coordinates. The frequency of the alternating voltage is kept below the lowest switching frequency of the cells 10a. The switching frequency is formed as the difference frequency between the frequency of the voltage applied to the x-control and the frequency of the voltage applied to the y-control by a non-linear circuit, thus forming the difference frequency between the x frequency and the y frequency. As a result, the pixel 11 with its individual pixel 11 frequency emits an alternating light, all the other cells in the n x m vicinity emitting individual frequencies. All the other cells are dark. The light coming through the transparent portion of the matrix passes through a collecting or focussing lens 17 directing the light onto a single photo-diode 15. The output of the photo-diode 15 is connected to a filter bank 16 having the pass characteristic shown in FIG. 4. The filters of the filter bank 16 are tuned to the individual modulation frequencies of the n×m cells. As a result of this arrangement the signals available at the output of the filters provide the brightness informations of the n×m cells.

The output signals from the filter bank 16 are supplied to the central processing unit 12 which at its output provides the tracking signals xN and yN.

Figure 3:
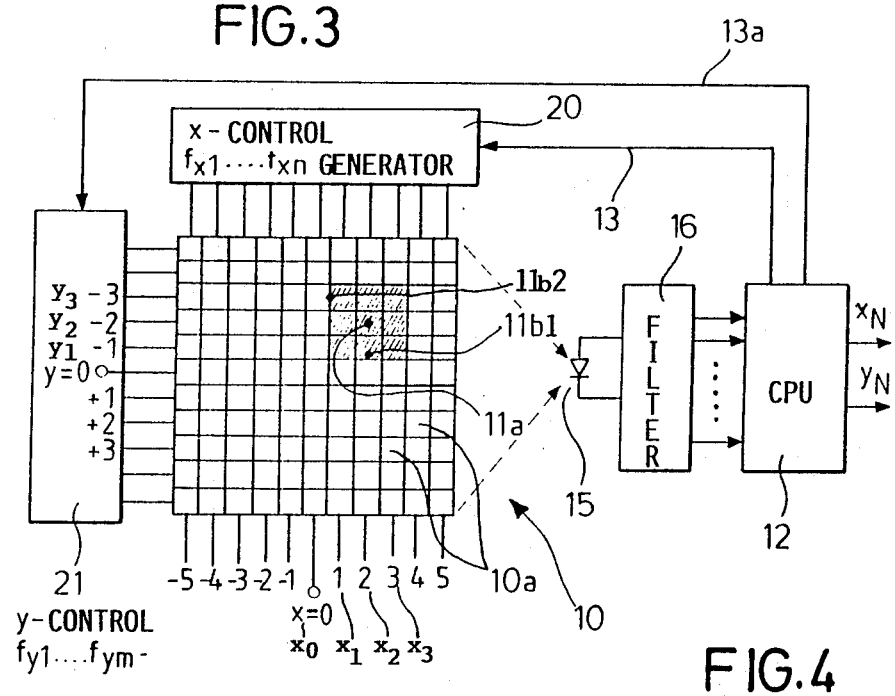
FIG. 3 illustrates the matrix and a circuit diagram for recognizing of interfering influences, for example, in an "n×m" vicinity around a pixel or matrix field in a second embodiment.

Description of CPU 12 and the x- and y-control 20, 21 shown in FIG. 3.

The computer 12 can be a microprocessor of the Type 68020 made by the Firm Motorola.

Normally, the tracking operation begins with the alignment onto the missile which initially is present alone. In the selected example of FIG. 3, the coordinates x=2, y=−2 of the missile are inputted to the computer. Next, the computer commands the coordinates $x_1$, $x_2$, $x_3$ to the x-control 20 and the coordinates $y_1$, $y_2$, $y_3$ to the y-control. The x-control comprises three generators for the frequencies $f_{x1}$, $f_{x2}$, $f_{x3}$. The y-control comprises three generators for the frequencies $f_{y1}$, $f_{y2}$, $f_{y3}$. Next, the x-control applies the alternating voltages with the frequencies $f_{x1}$, $f_{x2}$, $f_{x3}$ to the pixel matrix control wires $x_1$, $x_2$, $x_3$, and the y-control applies to the control wires $y_1$, $y_2$, $y_3$. Thereby, and due to the non-linear control characteristic of the individual cells, these cells are switched alternatingly to become transparent and opaque. In the case that is still free of noise, only one frequency $f_{x2}-f_{y2}$ appears at the filter bank and a signal appears at the output of the corresponding filter. The computer thereby receives the information that the useful process is located on pixel $x_2$, $y_2$. Additionally, "brightness" information is available which is checked whether it is in a range previously provided by the computer.

If the useful process should shift, for example to $x_1$ and $y_1$, a signal appears at the corresponding filter $x_1$, $y_1$ of the filter bank 16. Then, the computer commands or instructs the x- and y-control regarding the new triggering for the three-by-three vicinity, that is $x_0$, $x_1$, $x_2$ and $y_0$, $y_1$, $y_2$ so that the useful process is maintained in the center of the three-by-three vicinity.

An interfering or noise process generally enters at the margin of the three-by-three vicinity and hence is immediately recognizable as such. The coordinates of the interfering process (noise) are stored in the computer and a track is established for a shifting interfering process. When the track of the interfering process or processes has crossed the track of the useful process, the tracks are distinguished, after the crossing has taken place, by extrapolation of the tracks to determine which is the useful process and which is the interfering (noise) process. Thus, the computer sets the center of the three-by-three window (n×m) onto the useful process and outputs these coordinates $x_n$, $y_n$ as the track coordinates of the missile.

FIG. 3 shows an example embodiment in which the interfering processes or interfering pixel signals can be recognized for a further differentiation relative to the useful process or useful pixel signal from the missile. The following example will illustrate the function of the embodiment of FIG. 3.

The illuminated pixel 11a is determined by the coordinate $x_N=2$ and $y_N=2$ within the coordinates of the matrix 10. Two interfering light sources 11b1 and 11b2 are also shown. The coordinates for the interfering light source 11b1 are $x_{s1}=2$ and $y_{s1}=-1$. The coordinates for the second interfering light 11b2 are $x_{s2}=0.5$ and $y_{s2}=-3$. The useful pixel 11a is within a square of n=3 and m=3 to provide a 3×3 vicinity around the useful pixel 11a. This vicinity is evaluated as follows.

The central processing unit 12 applies individually a alternating voltage of a frequency to each of the contact wires $x_1$, and $x_2$. The frequencies of these voltages are $f_{x1}$, $f_{x2}$. Similarly, voltages with frequencies are applied to the contact wires $y_1$, $y_2$, and $y_3$. These voltages have the frequencies $f_{y1}$, $f_{y2}$, and $f_{y3}$. As a result, the individual pixels or fields defined by the respective coordinates in the n×m vicinity are exposed to beat frequencies having the sum and difference values as shown in Table I of FIG. 5. The invention utilizes the low-pass filter characteristics of the liquid crystal switching mechanism, whereby in this example, a limit frequency $f_{gLC}$ of 3 kHz is assumed. These frequencies $f_{x1}$, $f_{x2}$, $f_{x3}$, $f_{y1}$, $f_{y2}$, and $f_{y3}$ are so selected that the summing frequency is above the LC-matrix limit frequency $f_{gLC}$. Further, the frequency plan is so established that the difference frequencies are all below the $f_{gLC}$ frequency. As a result, individual pixels are eliminated as shown by the following example for which $f_{gLC}$ is 3 kHz.

$f_{x1} = 3$ kHz $f_{x2} = 4$ kHz $f_{x3} = 5$ kHz and $f_{y1} = 2.8$ kHz $f_{y2} = 2.5$ kHz $f_{y3} = 2.2$ khz With these frequencies a pixel frequency plan is obtained as shown in Table II of FIG. 6. It is necessary in this context to make sure that the smallest difference frequency is still high enough so that the transient or response time of the respective low-pass filter is still compatible or acceptable for the entire tracking system including the ground station and the tracked missile. The frequency spacings must be so large that the band-filter bank 16 or the low-pass filter bank can be realized in an efficient manner. In the present example, the half peak width of the band filter is selected at $\Delta f = 100$ Hz.

In the embodiment of FIG. 3 the photocell 15 receives 9 alternating light signals provided that each pixel 11 of the 3×3 vicinity is transparent and illuminated. These nine signals provide a signal mixture having the frequencies shown in Table II. The amplitudes of these signals are proportional to the brightness of the individual light points in each pixel 11.

Figure 4:
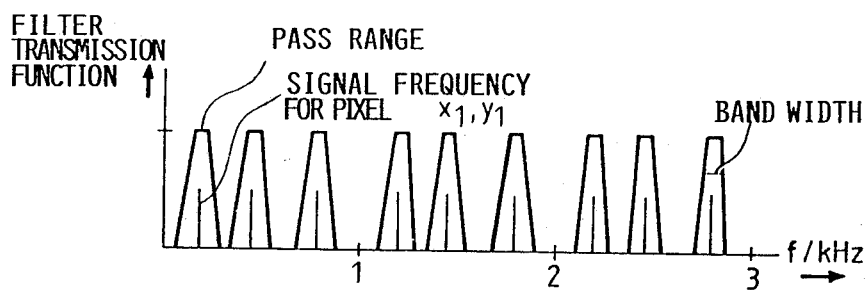
FIG. 4 illustrates the filter characteristic for the filter of FIG. 3 to show the pass zones for the individual pixels.

The photocell 15 supplies its output signal in parallel to the filter bank 16, whereby, for example, the half peak width of the filters is selected to be 100 Hz so that the response time is 10 ms. The filter characteristics are shown in FIG. 4. Each signal has its own pass range and the central processor unit 12 receives these nine signals for which it knows the pass location in the matrix 10 due to the rectangular coordinates of the pixels through which the respective light signals pass. The amplitudes of these signals represent, as mentioned, the brightness of the respective individual pixels.

If the so-called useful process or incoming light travels from $x_2$, $y_2$ to $x_1$, $y_1$ then the central processing unit 12 issues a command for applying the three voltages with the "x" frequencies to the connecting wires $x_0$, $x_1$, and $x_2$. It further controls the formation of an information window on the matrix 10 in accordance with the movement of the useful input light or process. It is also possible to control or place portions of this information window at any desired locations within the matrix 10, for example, to determine whether a previously recognized interfering light input or process is still located in the same position.

During the latch-on stage of the tracking operation of a missile, it is suggested according to the invention to divide the information window in a coarser manner, for example, by switching several neighboring pixels 11 together or in parallel by applying voltages with the same frequencies. For example it is possible to use four pixels or nine pixels as a unit. As a result, the respective "3×3" vicinity would contain 36 or 81 pixels respectively.

The PIM missile tracking according to the invention makes it possible to image and scan a scene with but one photocell 15 without the need for trouble-prone and expensive mechanical scanners. This is an important advantage having regard to the still expensive production of detector rows or even more expensive detector arrays. Another advantage of the invention is seen in that this system is no longer subject to the fact that individual detectors heretofore have not been homogenous from one detector to the other. The invention also simplifies the cooling problem. The present invention makes it further possible to pick out of a large viewing field without any problems only that area which is of interest.

A further advantage of the invention is seen in that the selection of the information can be done in an intelligent manner, that is to say, in a way that clearly separates the useful information from the interfering information. The present PIM tracking method is also applicable to other tracking operations, for example, for tracking a target and the like. Due to the information selection according to the invention the information flow between sensor and central computer unit can be easily handled in real time since the CPU controls the information window. Conventional imaging systems having a high resolution frequently cannot handle the just mentioned information flow in real time.

Although the invention has been described with reference to specific example embodiments, it will be appreciated, that it is intended to cover all modifications and equivalents within the scope of the appended claims.

What I claim is:

1. A pixel individual modulation method for tracking a missile, comprising the following steps:
    (a) directing incoming light onto a matrix having normally substantially opaque cells or small mirrors, which can be individually tilted arranged in a rectangular coordinate system,
    (b) selectively applying alternating voltages having different frequencies, to electrodes of said normally substantially opaque cells or circuits which contract at said small mirrors for individually modulating said cells to make said cells selectively substantially transparent, (c) controlling the application of said alternating voltages by a location determining central processing unit (12) in an "n×m" vicinity or area including a first cell receiving a useful incoming light beam and further cells receiving interfering light, wherein "n" and "m" are the numbers of cells forming said vicinity or area, whereby an alternating voltage of a determined frequency switches said first cell to be come transparent to pass useful alternating light while shutting out interfering light, (d) applying said useful alternating light to a single photosensor (15) for producing a pixel signal, and (e) passing said pixel signal through a band filter (16) into said central processing unit for producing respective tracking signals.

2. The method of claim 1, wherein said step of directing is performed by viewing a scene in which the missile travels and which has interference light sources, through a receiving optic (18) that directs useful light (19) and interfering light (19a) onto said matrix, wherein said step of applying is performed by passing light coming from a transparent cell through a collecting lens (17) onto said photosensor, and wherein said central processing unit controls said "n×m" vicinity for providing a viewing or information window.

3. The method of claim 1, wherein the frequency of the alternating voltage to be applied to a selected XY-pixel or cell is below the highest switching frequency of the matrix cell.

4. The method of claim 1, wherein for obtaining the useful pixel signal a detection with different frequencies is performed.

5. The method of claim 1, wherein interfering processes are recognized in said "n×m" vicinity around the useful cell or pixel and that for the further diffrentiation between the interfering process and the useful processes these interfering processes are employed, wherein between individual transparent electrodes of said cells beat frequencies are caused to occur having determined sum and difference frequency values while utilizing a non-linear switching mechanism, or a non-linear circuit which controls the pixels whereby the beat frequencies are selected so that the sum frequencies are higher than a matrix limit frequency and the difference frequencies are lower than the matrix limit frequency.

6. The method of claim 5, wherein the smallest difference frequency is so high that the response time of the corresponding low-pass filter is compatible with the entire tracking system including a ground station and the missile.

7. The method of claim 1, wherein during the phase of missile acquisition, several neighboring pixels of the "n×m" vicinity are controlled in parallel with the same x, and y frequencies, whereby a larger and coarser information window is obtained.

8. The method of claim 7, wherein the individual cells of the information window can be controlled on any desired location within the matrix, by said central processing unit.

9. The method of claim 1, wherein an individual pixel is controlled by two frequencies ($f_x$ and $f_y$) at an input of an individual non-linear pixel circuit for forming a difference frequency ($f_x - f_y$), and modulating light from said individual pixel with said difference frequency ($f_x - f_y$), whereby only twenty wires are needed instead of ten by ten wires.

10. A pixel individual modulation system for tracking a missile, comprising:

(a) means (18) for directing incoming light onto a matrix (10) having optical elements which are normally substantially optically inactive, said optical elements being arranged in a rectangular coordinate system, (b) means (12, 13, 13a, 13b, 13') for selectively applying alternating voltages having different frequencies, to electrodes (14) of said normally substantially optically inactive elements for individually modulating said elements to make said elements selectively substantially optically active, (c) means for controlling the application of said alternating voltages, including a location determining central processing unit (12) for determining optical elements in an "n×m" vicinity or area including a first element (11) receiving a useful incoming light beam and further elements (11a) receiving interfering light, wherein "n" and "m" are the numbers of elements forming said vicinity or area, whereby an alternating voltage of a determined frequency switches said first element (11) to become optically active to pass useful alternating light while shutting out interfering light, (d) a single focussing lens (17) for applying said useful alternating light to a single photosensor (15) for producing a pixel signal, and (e) band filter means (16) for passing said pixel signal into said central processing unit (12) for producing respective tracking signals (xN, yN).

11. The system of claim 10, wherein said optical elements forming said matrix comprises a plurality of liquid crystal cells arranged in said rectangular coordinate system, said liquid crystal cells being normally opaque when they are optically inactive, said liquid crystal cells being optically transparent when they are optically active.

12. The system of claim 10, wherein said matrix comprises a plurality of deformable mirror devices (DMD) or cells arranged in said rectangular coordinate system.

13. The system of claim 10, further comprising alternating voltage generator means (20, 21) arranged for generating voltages having different frequencies for application to said cells in said "n×m" vicinity, and means for controlling the generation of said different frequency voltages by said central processing unit (12).

14. The system of claim 10, wherein said optical elements are small tiltable mirrors which are optically inactive in one position and optically active in the other position, and wherein said means for selectively applying alternating voltages comprise circuit means for selectively and individually tilting said mirrors back and forth between said positions.

* * * * *